United States Patent [19]
Kostov et al.

[11] Patent Number: 5,898,254
[45] Date of Patent: Apr. 27, 1999

[54] ELECTROSTATIC LINEAR MOTOR WITH DEFORMABLE FEET BETWEEN A RUNNER AND A DIELECTRIC LAYER OF A STATOR

[75] Inventors: Edward Kostov; Vinceslao Dyatlov; Piero Perlo, all of Orbassano, Italy

[73] Assignee: CRF Societa Consortile per Azioni, Orbassano, Italy

[21] Appl. No.: 08/951,496

[22] Filed: Oct. 16, 1997

[30] Foreign Application Priority Data

Oct. 17, 1996 [IT] Italy .................................. T096A0846

[51] Int. Cl.[6] .............................. H02N 1/00; H02K 41/02
[52] U.S. Cl. ........................... 310/309; 310/308; 310/12; 310/40 MM
[58] Field of Search ............................. 310/309, 12, 308, 310/40 MM

[56] References Cited

U.S. PATENT DOCUMENTS 5,808,383   9/1998   Kostov et al. ........................... 310/12

*Primary Examiner*—Nestor Ramirez
*Assistant Examiner*—Karl Imayoshi Tamai
*Attorney, Agent, or Firm*—Sughrue, Mion, Zinn, Macpeak & Seas, PLLC

[57] ABSTRACT

Electrostatic linear motor comprising a planar stator having a capacitive structure formed by a metal layer and a layer of dielectric material and a runner movable parallel to stator and carrying resiliently deformable projecting feet formed by a thin conductive film, arranged in rolling contact with the layer of dielectric material of the stator. The layer of dielectric material has a non-linear polarization versus the electric field applied by a source for supplying voltage pulses, and is preferably constituted by a film of ferroelectric material with a high value of dielectric permittivity.

2 Claims, 3 Drawing Sheets

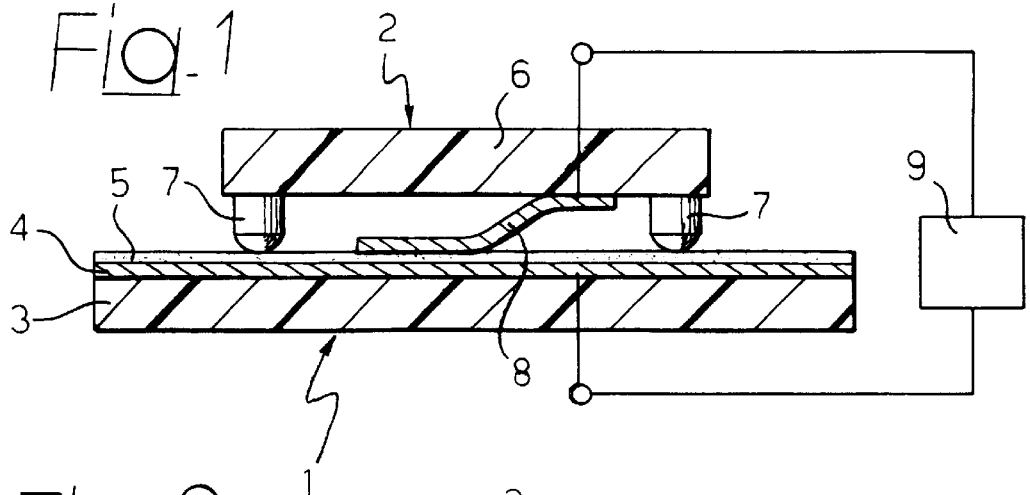
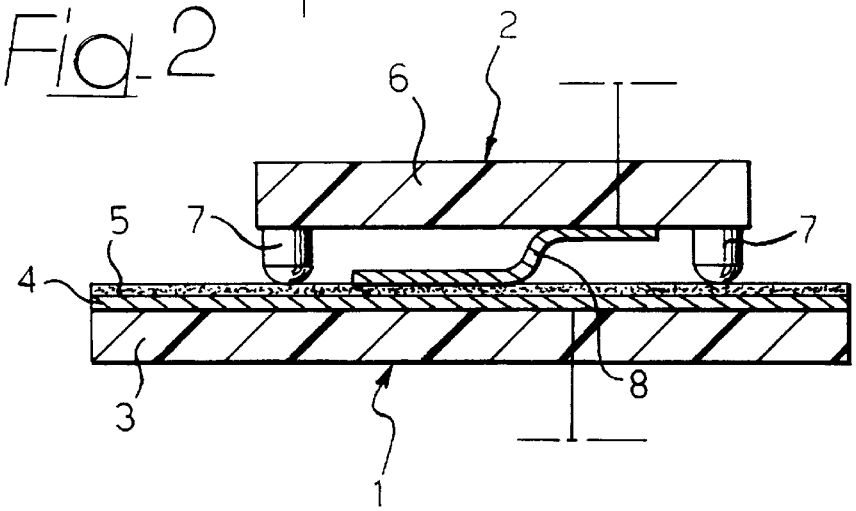
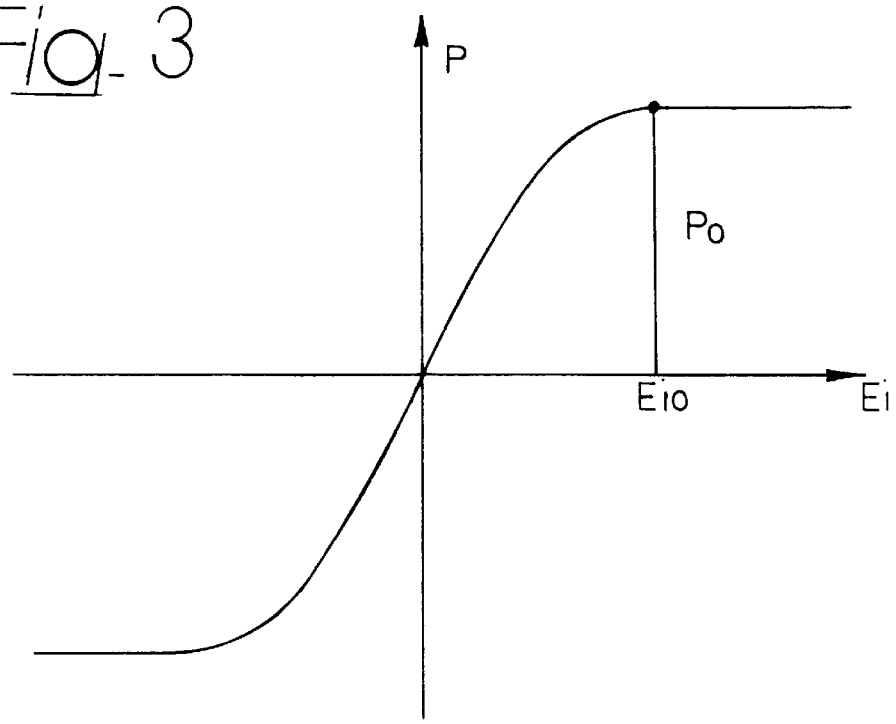

ELECTROSTATIC LINEAR MOTOR WITH DEFORMABLE FEET BETWEEN A RUNNER AND A DIELECTRIC LAYER OF A STATOR

BACKGROUND OF THE INVENTION

The invention generally relates to electrostatic motors having low power and small dimensions adapted for use as actuators in microelectronic technology applications for actuating mechanical devices and the like in conditions in which vibrations and shocks take place, such as in the automotive field.

In such applications, there have been proposed electrostatic motor-actuators of the piezoelectric type, in which the conversion of electromechanical energy is based on the reversed piezoelectric effect. These motors have various drawbacks, among which a relatively high cost of manufacture and insufficient reliability, they require quite high supplying voltages and have an insufficiently high efficiency. As a consequence, the use of these piezoelectric motors is not satisfactory usually for the applications mentioned at the beginning, particularly on board motor-vehicles.

Electrostatic linear reciprocating motors are also known, comprising a planar stator having a capacitive structure formed by a metal layer and a layer of dielectric material and a movable member parallel and spaced apart relative to the stator and carrying conductive thin film means defining resiliently deformable projecting feet arranged in contact with the layer of dielectric material of the stator, and means for supplying voltage pulses for applying an electric field between said feet and said metal layer of the stator so as to resiliently deform said feet by electrostatic effect and cause a translation thrust on the movable member along a direction parallel to the stator.

In electrostatic motor-actuators of this type, the use of a huge number of feet (or "petals" or "cilia") enables a vary rapid electrostatic capture effect to be obtained, which insures a very high reliability in operation which in practice is not affected by vibrations, planarity defects of the stator, presence of dust. For this reason, these motors are considered as being adapted for application to microelectronic systems installed on board motor-vehicles.

The peculiar characteristic of the conversion of electromechanical energy at the basis of the operation of these motors lies in that during rolling of the feet of the movable member along the stator an extremely high concentration of energy takes place at the interface between the feet and the layer of dielectric material, with a force equivalent to a pressure in the order of 100–150 kg/cm$^2$, and as a result of this, the force by which the movable member is displaced linearly relative to the stator reaches values up to 10N. The efficiency of this energy conversion is much greater than that typical of piezoelectric motors, and reaches values in the order of 90%.

However, the electrostatic motors of the above indicated type have some drawbacks, which may be summed up as follows:

relatively high supplying voltage (usually not lower that 200–300 V);
  appearance of partial discharges because of the high supplying voltage and the linear dependency between the intensity of the electric field and the polarization of the layer of dielectric material;
  formation of concentrated discharges in the layer of dielectric material, which involves the need of using voltage pulses of different polarities;
  insufficiently high energy concentration as a result of low permittivity of a dielectric with linear polarization.

SUMMARY OF THE INVENTION

The object of the present invention is that of overcoming said drawbacks, and this object is achieved since a linear electrostatic motor of the above indicated type is essentially characterized in that the layer of dielectric material has a non-linear polarization versus the applied electric field.

Preferably, this dielectric layer is constituted by a film of ferroelectric material, most advantageously a film of neobate-barium-strontium.

BRIEF DESCRIPTION OF THE DRAWINGS

The invention will be now described in detail with reference to the annexed drawings, given purely by way of non limiting example, in which:

FIG. 1 is a view partially in longitudinal cross-section diagrammatically showing the structure of a linear electrostatic motor according to the invention, in the energized condition, FIG. 2 is a view similar to FIG. 1 which shows the motor in the energized condition, FIG. 3 is a diagram showing polarization of the dielectric of the motor according to the invention versus the intensity of the applied electric field.

DETAILED DESCRIPTION OF THE INVENTION

Figure 4:
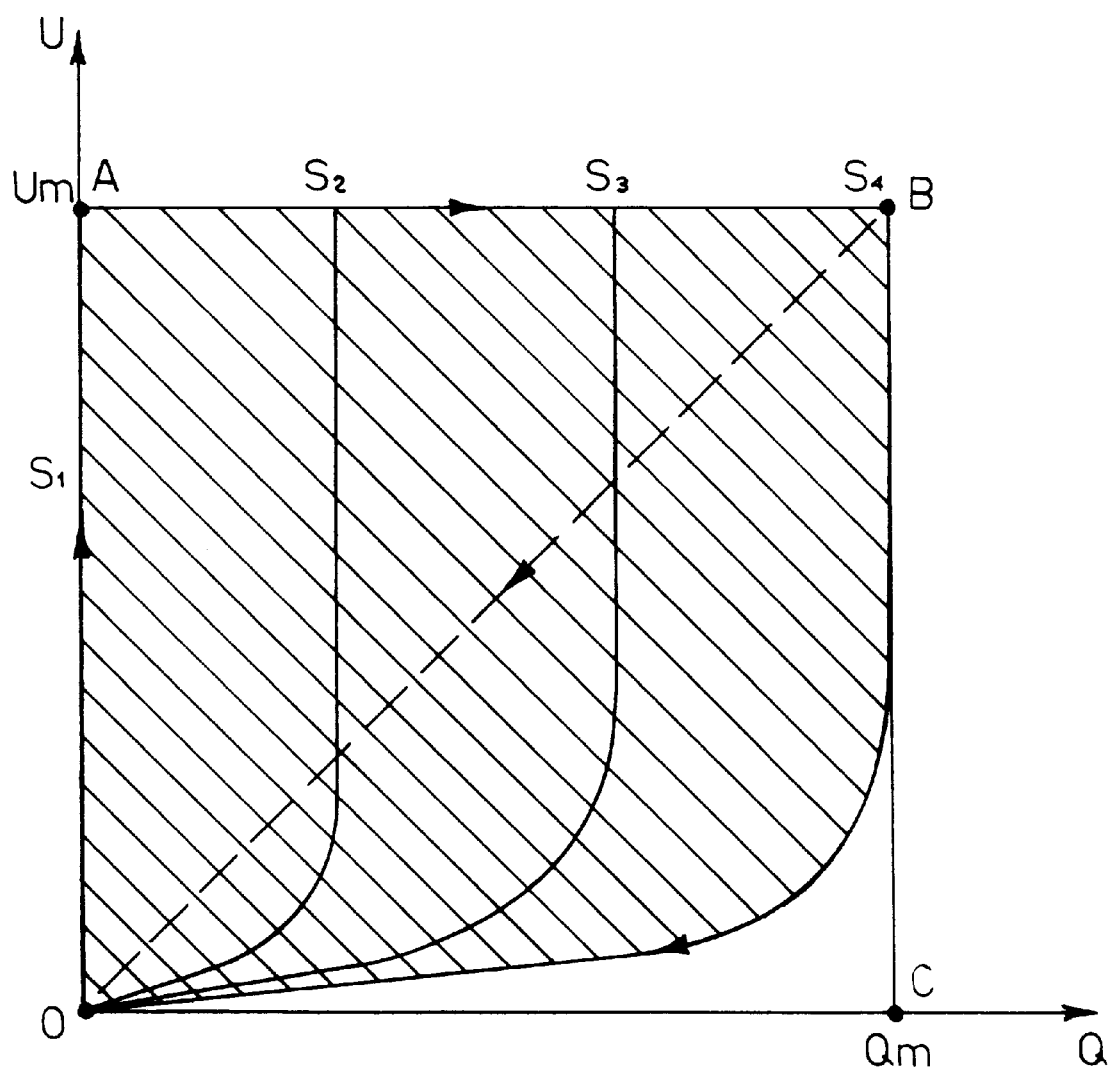
FIG. 4 is a diagram showing the conversion of electromechanical energy in the electrostatic motor according to the invention.

As shown in FIGS. 1 and 2, the basic structure of a linear electrostatic motor according to the invention comprises a stationary element or stator 1 and a movable element or runner 2.

The stator 1 comprises a base of insulating material 3, a metal layer 4 and a planar layer of dielectric material 5 overlapping the metal layer 4.

The runner 2 comprises a support of insulating material 6 provided at its bottom with supporting elements 7 in sliding contact with stator 1, as well as with resiliently deformable feet 8 (only one of which is visible in the drawings) constituted by conductive thin film elements projecting towards stator 1. Feet 8 have a substantially S-shaped cross-section in the rest undeformed condition, with flexes having large curvature radii, as shown in FIG. 1. These feet 8 are fixed at one end to support 6 of runner 2 and at the opposite end they are arranged in contact with dielectric layer 5 of stator 1. If necessary, the end hole of this end may be fixed, by any conventional means, to the dielectric layer 5.

The metal layer 4 and feet 8 are electrically connected, as diagrammatically shown in FIG. 1, to a source 9 supplying voltage pulses. In operation, the electric field generated by the supplying source 9 between the electrodes defined by the metal layer 4 of stator 1 on one hand and feet 8 of runner 2 on the other hand, causes a variation in the configuration of these feet 8 from the undeformed condition of FIG. 1 to the resiliently deformed condition of FIG. 2 (in which the flexes of the S configuration have a lower curvature radius) by electrostatic effect, and the resulting rolling along the dielectric layer 5 of the corresponding portion of feet 8. As a result, the runner is translated parallel to stator 1, leftwardly with reference to FIGS. 1 and 2, by a step of predetermined amplitude.

According to the main characteristic aspect of the invention, the dielectric layer 5 of stator 1 has a non-linear polarization P versus the applied electric field $E_i$. In particular, the dielectric layer 5 is preferably constituted by a film of ferroelectric material having a high value of dielectric permittivity $\in$, advantageously neobate-barium-strontium. The saturation of the polarization of such films takes place at an intensity of the electric field $E_i = E_{io} = (1,5-2).10^6$ V/m, and the polarization P is $P_o = (3-20).10^{-2}$ C/m² (FIG. 2).

The process of electrostatic rolling of feet 8 in the motor according to the invention which uses such dielectric layer 5 is given by the following equations:

$$\in_o E_1 + P(E_i) = \in_o E_e + \sigma;$$

$$E_i d_i + E_e d_e = U_m$$

in which:

$U_m$ = amplitude of the voltage pulse;

$E_i$, $E_e$ = intensity of the electric field in the film of ferroelectric material and in an operative gap, respectively;

$\sigma$ = density of an electric charge polarized on the surface of the ferroelectric film;

$P(E_i)$ = dependency of polarization in the ferroelectric film versus the electric field;

$\in_o = 8,85.10^{-12}$ F/m².

With the structure of the electrostatic motor according to the invention which has been described above, the electric charge is substantially completely concentrated in the region where rolling of feet 8 has already being completed ($d_e \approx 0$) i.e.:

$$Q = S\in_o E_e \approx S[P(U/d_i) - \sigma],$$

because at high polarization values $\in_o E_i << P(U/d_i)$.

On the basis of the foregoing relation, a diagram can be traced relative to the conversion of electromechanical energy of the electrostatic motor according to the invention, for example for a $\sigma = 0$. This diagram is shown in FIG. 4, in which the dotted line indicates the case of a dielectric with linear polarization and the OABC area indicates the integral of the electric energy fed to the motor by the supplying source 9 during an operative cycle (presence of the voltage pulse) and the OAB area indicates the integral of the electric energy during the execution of the electrostatic rolling of feet 8 and the OBC area indicates the electric energy stored in the capacitive structure at $S = S_4$ (completion of electrostatic rolling); $S_1 = 0 S_1 < S_2 < S_3 < S_4$.

From the diagram in FIG. 4 it is seen that at high non-linearity $P(E_i)$ of the dielectric layer of ferroelectric material 5 and at compact sticking of feet 8 on this layer 5 ($d_e = 0$) the motor according to the invention has an extremely high ratio between the electric energy spent on the execution of mechanical work and the total energy consumed by the supplying source 9 during a cycle. This ratio is considerably higher with respect to the case of conventional motors with electrostatic rolling on a dielectric having linear polarization, as well as with respect to the case of motors with reversed piezoelectric effect. This is summed up in the following table:

| Electrostatic motors | Ratio between mechanical work and total energy during a cycle |
| --- | --- |
| Reversed piezoelectric effect | 0.17–0.29 |
| Electrostatic rolling on ferroelectric film | Approaches to 1 |

The efficiency of energy converters with electrostatic rolling is characterized by a specific work of electrostatic rolling per rolling surface unit. In the case of a dielectric with linear polarization, this specific work is defined by the relation:

$$\alpha = C_o U^2/2$$

where $C_o = \in\in_o/d_i$ = specific capacitance.

From the diagram of FIG. 4 it is seen that this work in case of electrostatic rolling on a dielectric material constituted by a ferroelectric film is expressed by the relation $$\alpha \approx P_o U$$

in the case in which $P_o > \in E_{emax}$, where $E_{emax}$ = electric field intensity under which a noticeable tunnel current appears ($E_{emax} \approx 2.109$ V/m) a partial depolarization of the film of ferroelectric material takes place and $P_o$ should be replaced by $P_o - \sigma$ in the foregoing formula.

Figure 5:
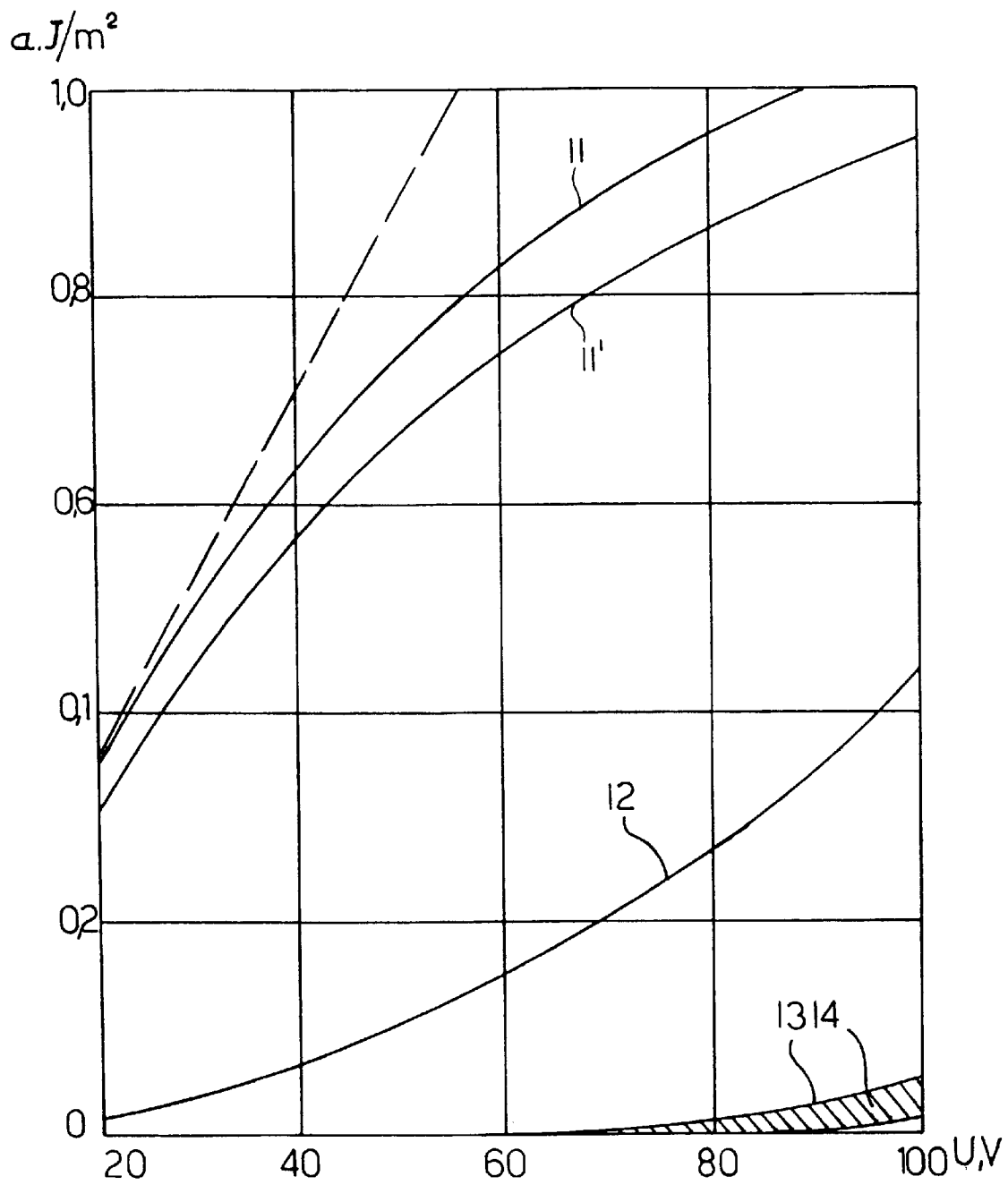
FIG. 5 is a comparative diagram showing the mechanical specific work relative to the voltage or potential applied.

FIG. 5 shows the specific work of electrostatic rolling versus voltage in the cases of electrostatic rolling on films of ferroelectric material (with reference to the depolarization, curve 11 corresponds to $P_o = 3.10-2$ C/m²; curve 11 corresponds to $P_o = 20.10-2$ C/m²; $E_{io} = 1,5.106$ V/m), in the case of electrostatic rolling on a dielectric with linear polarization (curve 12 corresponds to the case in which $d_e/\sigma = 10^{-7}$ m; curve 3 corresponds to the case of a film of poliethilene-tereftalate having a thickness of 3–4 $\mu$m). With a broken line the specific work is indicated in the case of electrostatic rolling on films of ferroelectric material at $P_o = 1.8.10^{-2}$ C/m².

Yet in FIG. 5, the specific mechanical work of a ceramic piezoelement having a thickness of 1 mm in an operative cycle is shown by the hatched area 14.

As shown by the diagram of FIG. 5, the specific work of electrostatic rolling is substantially greater in the case of rolling on films of ferroelectric material relative to the case of rolling on layers of dielectric with linear polarization. This work is greater also with respect to that of the conventional motors with reversed piezoelectric effect.

It is particularly important that the relatively high values of the specific works in the case of electrostatic rolling on films of ferroelectric material can be obtained with relatively low voltages, in the order of 10–30 V.

It will be clearly apparent from the foregoing that the high efficiency of the linear motor-actuator according to the invention which uses a film of ferroelectric material as the dielectric layer 5 for rolling derives from the non-linearity of the polarization of this material.

Naturally, the details of construction and the embodiments may widely vary with respect to what has been described and illustrated, without departing from the scope of the present invention, as defined in the following claims.

What is claimed is:

1. Electrostatic linear motor comprising a planar stator having a capacitive structure formed by a metal layer and a layer of dielectric material, and a runner parallel and spaced apart relative to the stator and carrying conductive thin film means defining resiliently deformable projecting feet arranged in contact with the layer of dielectric material of the stator, and means for supplying voltage pulses for applying an electric field between said feet and said metal layer of the stator so as to resiliently deform said feet by electrostatic effect and cause a translation thrust on the runner along a direction parallel to stator, wherein the layer of dielectric material has a non-linear polarization versus the applied electrical field, wherein said layer of dielectric material is constituted by a film of neobate-barium-strontium, and wherein said feet have a substantially S-shaped configuration in cross section.

2. A method for converting electric energy to mechanical energy comprising supplying voltage pulses to apply a non-linear electric field between at least one foot comprised of a thin conductive resilient film carried by a runner and a film of dielectric material carried on a metal layer on a stator, wherein said at least one foot and said film of dielectric material are in electrical contact, said electric field causing by electrostatic effect a deformation of said at least one foot to provide a rolling movement of said at least one foot to move said runner relative to said stator, said rolling being caused by a non-linear electric field intensity which increases with said conductive field approaching said dielectric material which has a non-linear polarization, and said dielectric material being comprised of a ferroelectric material comprised of neobate-barium-strontium.

* * * * *